March 8, 1960   J. Y. NAGGIAR   2,927,711
TANK STRUCTURE FOR ALTERNATIVE TRANSPORTATION
OF LIQUIDS AND SOLID GOODS
Filed Jan. 12, 1954   2 Sheets-Sheet 2

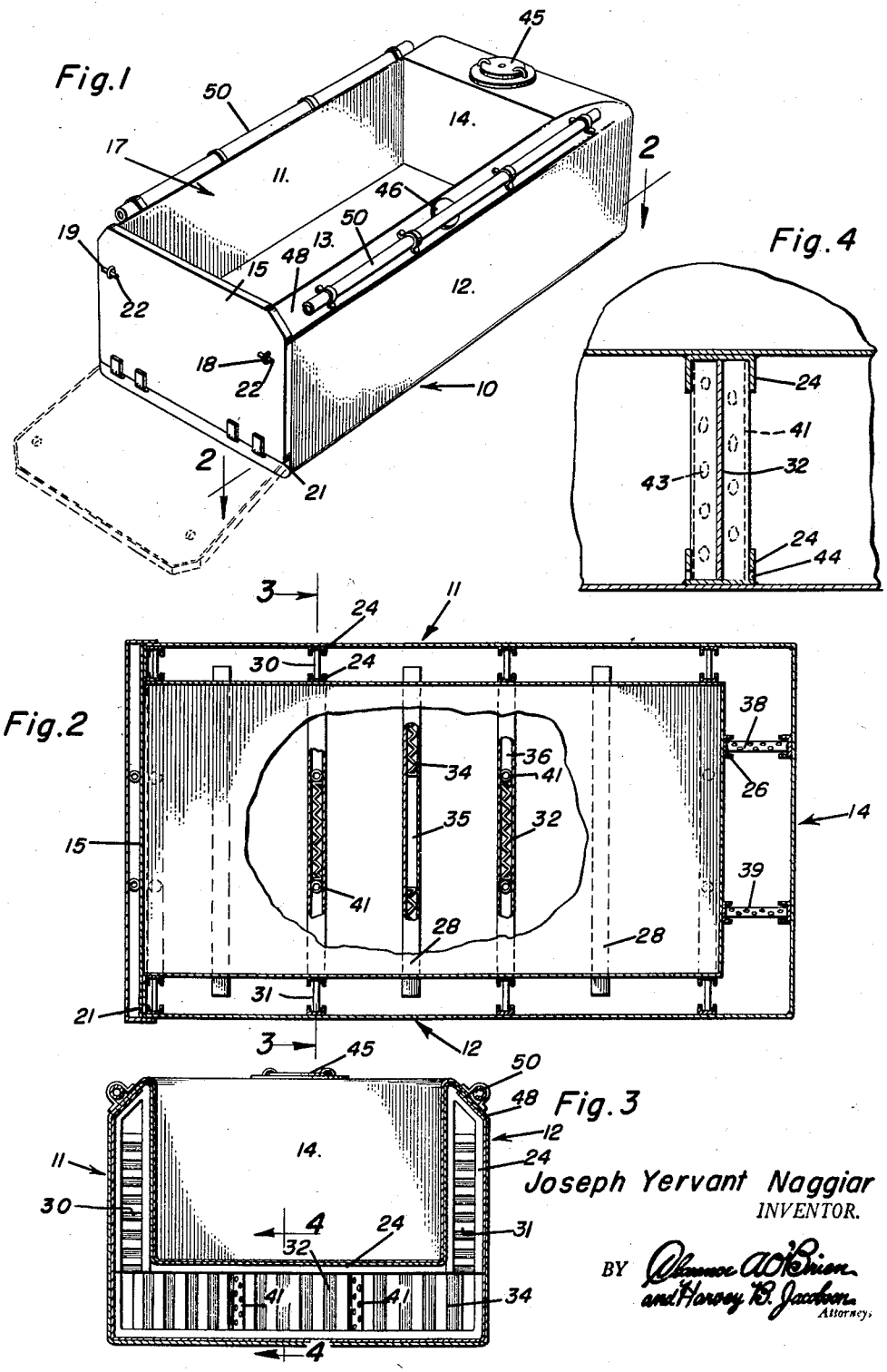

Joseph Yervant Naggiar
INVENTOR.

United States Patent Office 2,927,711
Patented Mar. 8, 1960

2,927,711

TANK STRUCTURE FOR ALTERNATIVE TRANSPORTATION OF LIQUIDS AND SOLID GOODS

Joseph Yervant Naggiar, Beirut, Lebanon

Application January 12, 1954, Serial No. 403,557

2 Claims. (Cl. 220—20)

This invention relates to tanks and other containers in which liquids may be hauled and it has for its main object to provide a tank suitable for the transportation of liquids which may be carried by, fixedly held or mounted on or form part of ships, tankers, barges, trucks, trailers or railroad cars and which is of such configuration and arrangement that it may also serve as a loading bed or a loading platform or an enclosed loading space for solid goods.

Such a dual function of a container for hauling goods involves a technical problem on account of the fact that the transportation of large quantities of liquids requires a specialization of the liquid containing structure in the form of a tank which specialization as a rule makes the tank unfit for the loading of other goods, and while such a specialization has great technical and other advantages, it has also the economical disadvantage that under the usually prevailing conditions the transport situation is such that the liquid, such as oil, gasoline, chemicals, etc. is prevalently or exclusively hauled in one direction, away from a certain point, or along one line of transportation, while the tanks after delivery of the fluid cargo are returned empty. This transport situation applies usually to maritime and river transportation as well as to land transportation and it is therefore a major economical advantage to be able to have a dual purpose construction permitting the hauling of a fluid in a tank which does not exclude the transportation of other goods.

The main technical problem connected with a tank specialized for fluid hauling which is simultaneously adapted for the transportation of other goods, consists in providing sufficient space for a full liquid load, comparable to the fluid loads usually hauled, while at the same time providing sufficient space for solid goods of approximately equal weight and in so arranging the tank that both loads have a rather low center of gravity.

It has already been proposed to construct vehicles with tanks of this type the top portion of which is the loading platform of the vehicle by utilizing the space between the wheels of a railroad car or truck to accommodate the tank, the body of the tank being mainly contained between the wheels and reaching down to the ground or to the tracks, while that part of the tank which is above the wheels spreads and forms a lateral extension of the central tank portion of relatively very little depth. However, this construction permits to arrange a large loading platform on the top of the tank. Constructions of this type are however not generally usable as the space between the wheels is not always available.

It is therefore a main object of the invention to provide a tank structure for such dual use which is usable on all means of transportation such as ships, barges, trucks, trailers, railroad cars and the like and which does not entail the use of constructions which are tied to certain specialized conditions.

According to the invention the tank has the general shape of a container for solid goods which is however provided with double walls and with a double bottom, these double walled container walls enclosing the loading space for solid goods and serving as their container and support, the usable tank volume being mainly the volume enclosed between said double walls and double bottom of the container wall and bottom. The space between the container walls can be loaded with goods, this space being still sufficiently large for loading solid goods of a weight which are approximately equal to the fluid load which can be held within the tank formed between the double walls and double bottom of the container.

Another object of the invention consists in providing a tank structure which is open at the top but is essentially closed on three sides the fourth side being closable by a special door serving also as a reinforcing structure for the tank.

A further object of the invention consists in providing a tank structure which is open at the top but closed on the front and rear sides and on part of the sides, the central portions of the side walls being open and forming loading and unloading openings for the solid goods.

It is a further object of the invention to provide a tank of the above described type which is so reinforced that it is capable of supporting relatively heavy loads on its bottom and on its sides, such reinforcements being however so disposed that they do not in any way disturb or impair the circulation of the liquid within the tank or the cleaning of the tank after use.

A further object of the invention consists in so disposing the reinforcing structure within the tank, that free circulation is permitted, while at the same time movement of the entire body of fluid in one direction such as movement due to sudden starting or stopping of the carrying vehicle is prevented and braked.

The invention is illustrated in the accompanying drawings showing two embodiments thereof. It is however to be understood that the two embodiments shown were selected in order to explain the principle of the invention and the best mode of applying said principle. The drawings are not intended to be limitative, or to give a survey of all the constructions embodying the invention and a departure from the modifications specifically illustrated is therefore not necessarily a departure from the principle of the invention.

In the drawings:

Figure 1 is a perspective view of one embodiment of the invention, the figure illustrating also the position of the rear door during hauling, the position of the door during loading or unloading with solid goods being shown in dotted lines.

Figure 2 is a sectional plan view of the tank illustrated in Figure 1 the section being taken along line 2—2 of Figure 1.

Figure 3 is an elevational cross sectional view of the tank, the section being taken along line 3—3 of Figure 2.

Figure 4 is a fragmentary elevational sectional view through the bottom portion of the tank the section being taken along line 4—4 of Figure 3.

Figure 5:
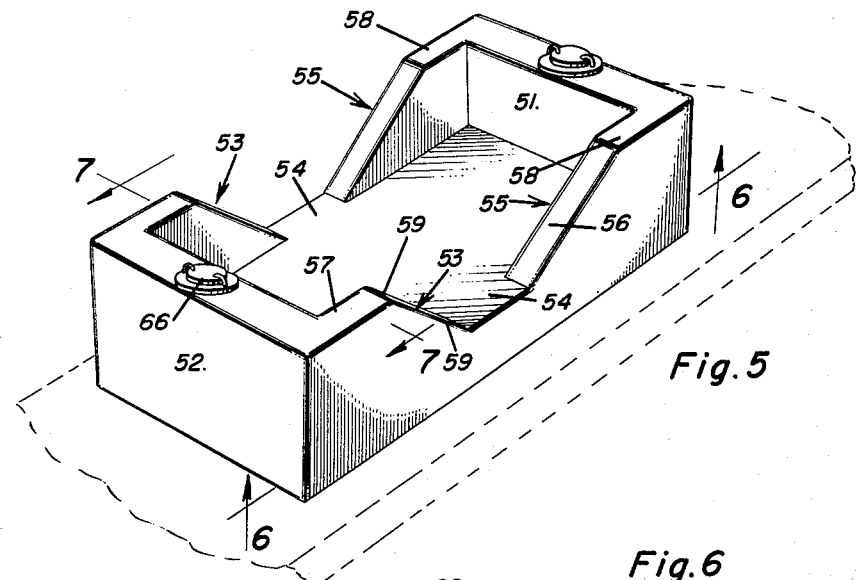
Figure 5 is a perspective view of a second embodiment of the invention.
Figure 6:
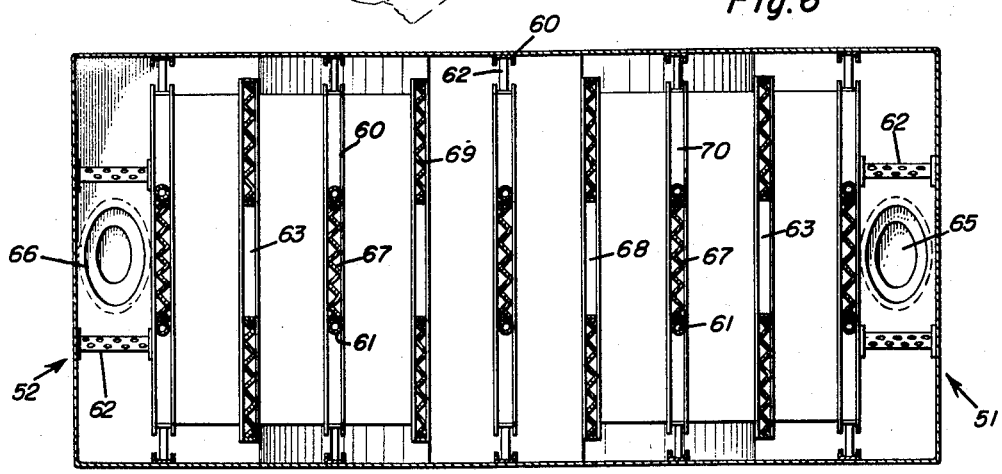
Figure 6 is a sectional plan view of the tank illustrated in Figure 5, the section being taken along line 6—6 of Figure 5 and the direction in which the cross-section is viewed being indicated by the arrows.

In the embodiment of the invention shown in Figures 1 to 4 the tank has the shape of a double walled box structure 10 open at the top and at the rear side, said box structure comprising double walled side walls 11, 12, a double walled front wall 14 and a double walled bottom 13, enclosing a loading space 17 for solid goods. The construction of the embodiment shown in Figures 1 to 4 is therefore mainly adapted for use on trucks and other wheel supported vehicles. The open part which is shown to be on the rear side in the figure must however not necessarily be located at this place. The open portion of the wall is closed by a door 15 which is hinged to the remainder of the tank, preferably to the bottom portion of the container, and which may be turned around a horizontal axis located near the said bottom. According to the invention this door also fulfills the additional purpose of forming a reinforcement of the rear portion between the two double walled spaced side walls of the tank in order to take up the lateral component of the pressure due to the liquid contained within the double walls. The door in order to serve as a support may be provided with openings 18 through which bolts with eyes at their ends 19 may pass, said bolts being carried by a plate 21 fixed on the transverse portion of the double walls which together form the side wall of the container. The door is best provided with narrow slots through which the eyes 19 pass. Locking bolts 22 may be passed through the eyes 19 to firmly hold the door against the end walls. The door may preferably be double walled and it is reinforced by a suitable internal reinforcing structure, such as rods, links or profiled irons.

When the locking bolts 22 are removed the door may maybe lowered and may be brought to the position shown in dotted lines, thus permitting the loading and unloading of the space enclosed between the double walled side walls 11, 12 and the front wall 14.

As indicated in Figures 2, 3 and 4 the spaces between the double walls which form the side walls 11, 12, the front wall 14 and the bottom 13 of the loading box or container for solid goods, intercommunicate and form a single tank which may be filled with the liquid to be hauled. The double walls of each side wall or front wall are connected by transverse or end walls and the tank is thus completely closed and consists of four such intercommunicating spaces three extending mainly in the vertical direction and one of them, the bottom, extending essentially in a horizontal direction.

As considerable pressure acts on the walls, either directed towards the loading space and towards the outside when the liquid fills the tank, or from the inside towards the bottom and the side walls when solid goods are hauled, the space between the double walls is reinforced. This reinforcement consists for example in channel irons 24, 26 running along a cross-section of the intercommunicating spaces and forming a completely closed frame along the insides of the double walls facing each other to which they are preferably welded. A number of such channel irons 24, 26 is arranged, and spaced along the container reinforcing and holding the vertical and horizonal walls of the double walled structure simultaneously.

In addition to these reinforcing profiled irons 24, 26 encircling as a closed frame the intercommunicating spaces between the double walls, straight channel irons 28 may be arranged between the spaced channel irons 24, 26 which cover practically mainly the upper and lower one of the double walls of the bottom. Corrugated iron sheets 32 and 34 are arranged between those parts of the closed frames 24, 26 which face each other or between the two channel irons 28 at the upper and lower wall of the bottom portion of the tank which corrugated sheets serve as a further reinforcement taking up the pressure of the load placed into the hollow interior of the tank or the pressure of the liquid filled into the tank which is upwardly directed. Further these corrugated iron sheets act as baffles and form a resistance against displacement of the liquid in the interior of the tank. Openings 35, 36 are provided through which the liquid may pass. But these openings 35, 36 are preferably staggered in such a way that no direct flow of the entire liquid through the tank may occur. The corrugated sheet iron plates stop all sudden movements of the entire liquid in one direction which may occur at the starting of the vehicle or during a sudden stopping or braking of the same.

A further reinforcement of the space between the double walls especially the front section of the container consists of horizontal tube sections 38, 39 which serve as a reinforcement for this part of the tank and run from wall to wall. Vertical tube sections 41 are inserted on both sides of the corrugated iron sheets near the openings 36 which are left for the circulation of the liquids. These tube sections connect the channel iron sections of the closed channel iron frames 24, 26 which face each other.

The vertical tubes may be fixed by welding to the channel irons which in their turn are also welded to the sheet iron plates of which the tank is formed. Special sockets for these tubes may be provided for the horizontal tubes on those parts of the wall where no channel irons are disposed.

The tubes are preferably provided with a number of holes one of said holes being near the top portion of the same and another near the bottom portion in order to permit filling of the interior of the tubes and emptying of the same when the tank is filled with a liquid or emptied.

The reinforcement of the interior of the tank may also be made with other flanged steel beams. Preferably beams are selected which have a flat portion which may be attached by welding to the walls of the tank. The channel irons (and other flanged beams) may be preferably perforated (at 44) in order to permit a complete evacuation of the liquid from the tank and in order to avoid pools of liquid remaining therein upon evacuation.

The metal or other material of which the tank and the reinforcing structure is made, may be selected appropriately in order to reduce the weight or in order to be in conformity with transport conditions, or in order to offer a higher corrosion resistance to certain special liquids to be hauled in the tank etc. Aluminum and its alloys may, for instance, be used to reduce the weight of the tank or of its reinforcements.

The withdrawal of the liquid and the emptying of the tank is best done by means of hose or pipe sections 50 inserted through suitable evacuation openings provided at any suitable place (not shown) which place will however vary with the particular circumstances under which the tank is used.

A large manhole 45 is provided on the front portion of the tank to allow inspection and cleaning of the same. A second and smaller manhole 46 may be arranged on the top portion of one of the side walls 12 to serve as an auxiliary opening and as a small manhole.

Preferably the top portions of the side walls 11, 12 are both inclined and on the inclined portion the evacuation pipe or hose sections 50 are mounted. These pipe sections may therefore be carried on the tank without projecting beyond the rectangular profile of the tank.

Figure 7:
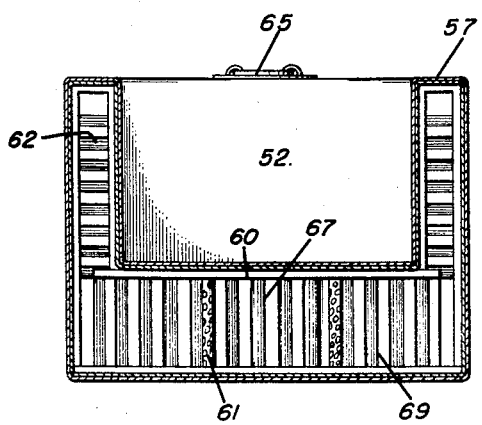
Figure 7 is a cross-sectional view of the tank illustrated in Figure 5 the plane along which the section is taken being inclined towards the bottom and being indicated at 7—7 in Figure 5.

While the modification illustrated in Figures 1 to 4 is primarily of advantage when used in connection with trucks or railroad cars, the modification illustrated in Figures 5 and 7 is one adapted for the special needs in connection with the transportation of the tank on ships, barges and airplanes.

The tank construction is approximately the same but in this modification the front and rear walls 51, 52 of the structure are both double walls forming part of the tank and are continuous while each side wall consists of two sections 53, 55 which are separate, leaving a loading opening 54 between them. Each side wall section 53, 55 consists preferably of a lateral wing 57, 58 projecting from the front or rear wall at right angles thereto respectively, each such wing being of a trapezoidal shape closed by an inclined portion 56, 59 running from the top of the lateral wing 57, 58 towards the lateral opening 54 at the bottom of the solid goods container. The loading opening 54 is thus also of trapezoidal shape.

The reinforcement of the interior of the tank is obtained in the way already described in connection with Figures 1 to 4 by means of channel irons 60 forming substantially closed frames running along both walls of the double wall and along the top and bottom walls of the bottom in a substantially transverse plane on the inside of the space enclosed by the double walls which face each other. The front and rear walls 51, 52 which are also double walls are reinforced in the manner already described by means of horizontal tubes 62. Corrugated iron sheets are inserted between the various parts of the frame and openings are provided in these corrugated iron sheets, and vertical reinforcing tubes are mounted in the manner already described in connection with Figures 1 to 4. Also in this construction between the channel irons 60 forming closed frames, reinforcing the bottom and side wall structure, straight reinforcing channel irons 63 are provided along the double walls of the bottom between which corrugated sheets or corrugated irons are placed which are welded to the channel irons for further reinforcement. Vertical tubes 61 may be used for reinforcing the structure on both sides of the openings 68, 70 provided in the corrugated sheets 67, 69. The disposition of the openings 68 and 70 is the same as that already described.

Large manholes 65 and 66 are provided at the top of the front and rear wall 51, 52 for cleaning and inspection purposes.

Tanks such as described may either be carried on deck of barges or may be mounted on ships within the cargo space or may be carried by plane.

From the above it will be seen that the combined tank and loading container according to the invention permits alternatively the transportation of a normal charge of liquids for istance in one direction and of a normal charge of goods and solid materials in another direction, for instance on the return journey.

An example will show that during the two hauls the normal load is not substantially changed when compared with the tanks or with the loads which are now actually employed. If for instance, the structure according to the invention has outer dimensions of 4.5 m. longitunally and has a width of 2.5 m. and a height of 1.75 m. with the two walls of the double wall having a distance of 0.55 m. between them for the double walls on the front or rear side and a distance of 0.3 m. between the two double side walls, this space encloses an effective volume of the liquid of about 10 m.³. This is approximately the standard carrying capacity of a normal tank.

The central cavity within which a load of solids may be stored consists in this case of a platform of 7.6 m.² with a depth of 1.2 m. which corresponds exactly to the standard loading capacity for a truck carrying a load of ten tons.

A further advantage resulting from the construction according to the invention consists in the fact that such a container will practically never be idle because it may be filled constantly either with liquid or with solid goods or may be charged with a liquid in both directions if available or with solids in both directions if for instance this should prove to be of advantage. The vehicle which is provided with such a container is therefore universally usable.

A further advantage is also derived in connection with vehicles which are specially built for liquids only and for special duty. For instance, municipal vehicles are frequently built solely for the purpose of cleaning streets or to act as water vans used in connection with fire engines and the like. Such vehicles are only temporarily used and then kept idle in garages for long periods of time. If a tank according to the invention is used on such a vehicle, vehicles of this type may be in constant use thus for instance permitting a reduction of the number of vehicles which a municipality must keep on hand.

It will be clear that changes of an unessential nature may be made and especially adaptations to special purposes may be effected without in any way departing from the essence of the invention as defined in the annexed claims.

What is claimed as new is as follows:

1. Freight carrying means for the alternative transportation of different kinds of goods of a predetermined maximum weight comprising a mobile, unattached self-supporting transportation tank unit, adapted for transportation and storage of goods independently of any vehicle and for transfer from one vehicle to another and from a vehicle to a storage space, provided with an outer liquid storing tank structure adapted for receiving and for supporting the full maximum load, having a bottom tank section with a flat load supporting bottom and side tank sections at substantially right angles, forming a vertical continuation of the bottom tank, said side tank sections surrounding the central portion of the bottom tank on all sides with the exception of a section thereof, and forming with the bottom tank a substantially prismatic body the bottom of which is a supporting surface, the inner side walls of the side tanks and the upper wall of the bottom tank enclosing a space forming a further tank container, open at the top and accessible through the section not surrounded by the side tank sections, and adapted to receive, to support and to store the full maximum load of dry goods, reinforcing and supporting means, supporting the full maximum transport weight on the said upper wall of the bottom tank section and taking up the lateral pressure of the maximum load on the inner walls of the side tank sections, said means including supporting and reinforcing elements between the upper and the lower wall of the bottom tank adapted to support the upper wall of the bottom tank and to transmit the maximum load to the bottom of the bottom tank, the said supporting and reinforcing means being arranged within the liquid container, means for transmitting pressure acting on the inner side wall of the side tank sections to the outer wall simultaneously reinforcing each of said walls, corrugated iron sheets inserted between reinforcing and supporting structural elements in staggered relation providing large openings for the circulation of the liquid within the tank space, said openings being arranged in staggered relationship so that the corrugated iron sheets act as surge baffles preventing displacement of the entire body of liquid in one direction during periods of acceleration or deceleration of the freight carrying means.

2. Transportation means for the alternative transportation of carloads of liquids and solid goods comprising a mobile, unattached and independently transportable load carrying tank unit, adapted to be transferred from one vehicle platform to another and from a vehicle to a storage platform consisting of a double wall structure, essentially prismatic on the outside, enclosing an inner essentially prismatic loading space for solid goods, open at and accessible from the top and one side, said double wall structure including a prismatic liquid storing bottom tank enclosed by a flat essentially rectangular top wall forming simultaneously the bottom of the solid goods loading space, and a flat parallel bottom wall of a larger area on the sides and in front, forming a flat resting surface of the liquid storing tank unit, and adapted to rest on a vehicle platform, parallel outer and inner side walls, projecting upwardly and substantially at right angles from said top wall and from said bottom wall of the bottom tank respectively, forming side tanks, closed at the top and communicating with the bottom tank which forms the main tank and with each other, and a wall reinforcing and load supporting structure, including transverse load supporting and load pressure transmitting elements running on the inside of the side walls and bottom tank walls, supporting elements inserted between the upper and lower wall of the bottom tank at right angles to the bottom tank walls for taking up and distributing the weight of the solid goods acting on the top wall of the bottom tank and for transmitting the weight to the bottom wall of the bottom tank which forms the planar supporting surface on which the tank unit rests, two double walled side wall sections connected with the end walls being of trapezoidal shape and shorter than the total length of the bottom so that an opening is left between two sections on the same side, and the upper edge of the side wall section near the opening being inclined relative to the bottom and providing a trapezoidal loading opening between the side wall sections on each side of the bottom structure.

References Cited in the file of this patent

UNITED STATES PATENTS

| | | |
|---|---|---|
| 242,586 | Berney | June 7, 1881 |
| 731,672 | Eberlein | June 23, 1903 |
| 1,007,828 | Webb | Nov. 7, 1911 |
| 1,022,975 | Shepard | Apr. 9, 1912 |
| 1,093,218 | Van Patten | Apr. 14, 1914 |
| 1,462,347 | Kramer | July 17, 1923 |
| 1,561,769 | Ballew | Nov. 17, 1925 |
| 1,830,591 | Clark | Nov. 3, 1931 |
| 1,993,500 | Benner | Mar. 5, 1935 |
| 2,039,452 | Robinson | May 5, 1936 |
| 2,533,772 | De Frees | Dec. 12, 1950 |
| 2,723,862 | Dalglish | Nov. 15, 1955 |